(12) United States Patent
Yachida

(10) Patent No.: US 11,209,517 B2
(45) Date of Patent: Dec. 28, 2021

(54) MOBILE BODY DETECTION DEVICE, MOBILE BODY DETECTION METHOD, AND MOBILE BODY DETECTION PROGRAM

(71) Applicant: NEC Corporation, Tokyo (JP)

(72) Inventor: Shoji Yachida, Tokyo (JP)

(73) Assignee: NEC CORPORATION, Tokyo (JP)

( * ) Notice: Subject to any disclaimer, the term of this patent is extended or adjusted under 35 U.S.C. 154(b) by 134 days.

(21) Appl. No.: 16/494,349

(22) PCT Filed: Jan. 17, 2018

(86) PCT No.: PCT/JP2018/001189
§ 371 (c)(1),
(2) Date: Sep. 16, 2019

(87) PCT Pub. No.: WO2018/168182
PCT Pub. Date: Sep. 20, 2018

(65) Prior Publication Data
US 2020/0088831 A1 Mar. 19, 2020

(30) Foreign Application Priority Data

Mar. 17, 2017 (JP) .............................. JP2017-052195

(51) Int. Cl.
*G01S 3/802* (2006.01)
*G01S 13/86* (2006.01)
(Continued)

(52) U.S. Cl.
CPC .............. *G01S 3/802* (2013.01); *G01S 3/782* (2013.01); *G06T 7/215* (2017.01); *G06T 7/246* (2017.01)

(58) Field of Classification Search
CPC ........ G01S 3/802; G01S 3/782; G01S 13/867; G01S 13/91; G01S 15/86; G01S 3/803;
(Continued)

(56) References Cited

U.S. PATENT DOCUMENTS 8,260,325 B2 * 9/2012 Bando .................... G01S 5/0072
455/456.6
9,772,395 B2 * 9/2017 Park ....................... G01S 5/0263
(Continued)

FOREIGN PATENT DOCUMENTS

JP H08-156723 A 6/1996
JP 2002-260167 A 9/2002
(Continued)

OTHER PUBLICATIONS

Chavez-Garcia et al., Multiple Sensor Fusion and Classification for Moving Object Detection and Tracking, IEEE 2015, IEEE Transaction on Intelligent Transportation system, pp. 99, pp. 1-10, 10.1109/TITS.2015.2479925. hal-01241846. (Year: 2015).*
(Continued)

*Primary Examiner* — Ishrat I Sherali
(74) *Attorney, Agent, or Firm* — Sughrue Mion, PLLC

(57) ABSTRACT

A mobile body detection device: determines, in the case where a position of a first mobile body and a position of a second mobile body are approximately the same, that a mobile body is detected at the position; and determines, in the case where the position of the first mobile body and the position of the second mobile body are different and any of first reliability and second reliability exceeds a threshold, that a mobile body is detected at a position of a mobile body corresponding to the reliability exceeding the threshold.

10 Claims, 13 Drawing Sheets

(51) Int. Cl.
*G06T 7/292* (2017.01)
*G06T 7/215* (2017.01)
*G06T 7/246* (2017.01)
*G01S 3/782* (2006.01)

(58) Field of Classification Search
CPC .................. G06T 7/215; G06T 7/246; G06T 2207/10021; G06T 2207/30232; G06T 7/292; G06T 7/285; G08B 13/194
USPC .......................................................... 382/103
See application file for complete search history.

(56) References Cited

U.S. PATENT DOCUMENTS

| | | | | |
|---|---|---|---|---|
| 10,504,370 | B2* | 12/2019 | Mukai | B60W 50/0097 |
| 10,761,538 | B2* | 9/2020 | Ball | G01S 17/931 |
| 2012/0030154 | A1* | 2/2012 | Nicholson | G01S 7/003 706/12 |
| 2017/0186291 | A1* | 6/2017 | Wenus | G01S 3/786 |
| 2021/0033722 | A1* | 2/2021 | Sondergaard | G01S 13/66 |
| 2021/0200241 | A1* | 7/2021 | Oyama | G05D 1/0278 |

FOREIGN PATENT DOCUMENTS

| | | |
|---|---|---|
| JP | 2005-337954 A | 12/2005 |
| JP | 5720380 B2 | 5/2015 |
| JP | 5888117 B2 | 3/2016 |

OTHER PUBLICATIONS

International Search Report for PCT Application No. PCT/JP2018/001189, dated Apr. 10, 2018.

* cited by examiner

MOBILE BODY DETECTION DEVICE, MOBILE BODY DETECTION METHOD, AND MOBILE BODY DETECTION PROGRAM

This application is a National Stage Entry of PCT/JP2018/001189 filed on Jan. 17, 2018, which claims priority from Japanese Patent Application 2017-052195 filed on Mar. 17, 2017, the contents of all of which are incorporated herein by reference, in their entirety.

TECHNICAL FIELD

The present invention relates to a mobile body detection device, a mobile body detection method, and a mobile body detection program for detecting a mobile body using sensors.

BACKGROUND ART

Aerial photography using drones is performed in recent years. By aerially photographing a subject using a camera carried by a drone, for example, photographing of locations not accessible by helicopters or light aircraft and surveying of locations that is dangerous to humans and takes long time can be achieved easily.

However, as drones have become popular, the number of incidents and accidents such as falling to national treasure buildings or locations where people come and go due to poor control and intentional crashes for terrorism or mischief has been increasing. Hence, techniques of determining airspace in which drones can fly and detecting objects flying in the airspace are in demand, and various detection systems using acoustics or radar and the like are proposed. Proposed techniques are not limited to drones, and techniques of detecting objects using two types of imaging means that differ in sensitivity wavelength are also proposed.

For example, Patent Literature (PTL) 1 proposes a method of, for the purpose of detecting a falling object on a road, detecting each moving object together with movement of vehicles from predetermined two types of camera video and detecting any falling object that appears to be dangerous.

PTL 2 proposes an object detection method, too. With the method described in PTL 2, for the purpose of detecting a mobile object by a vehicle-mounted camera for automatic driving or automatic brake assistance, video that can be input from predetermined two types of camera video and a look-up table (LUT) associating with environment changes are prepared to prevent a failure to detect a person or an obstacle.

CITATION LIST

Patent Literatures

PTL 1: Japanese Patent No. 5720380
PTL 2: Japanese Patent No. 5888117

SUMMARY OF INVENTION

Technical Problem

However, PTL 1 and PTL 2 both assume that the moving camera installation location is on a vehicle. Accordingly, changes of the background are limited, and the background of the part that needs to be subjected to object detection is relatively simple. To improve mobile body detection accuracy, it suffices to improve robustness against environmental changes such as day or night and rain or shine.

The object detection method described in PTL 1 acquires images captured by a first camera and a second camera that differ in detection wavelength as acquired images, detects the moving state of each object on the road from the acquired images, and distinguishes a stationary object and a mobile object. Moreover, the object detection method calculates stereoscopic information of each object on the road from the acquired images, integrates the feature quantity of each processing result, and determines a falling object. This method is, however, not suitable for detection of a mobile body, such as a drone, that is small as compared with a screen and moves freely and whose background changes in a complex manner.

The object detection device described in PTL 2 changes and controls independently a composite parameter used in image generation for subject detection and a composite parameter used in image generation for visual recognition. The object detection device described in PTL 2, however, does not involve consideration for image generation for subject detection in the case where the background changes in a complex manner.

Moreover, in the case of detecting a mobile body using two sensors such as cameras as in the methods described in PTL 1 and PTL 2, there is a problem in that mobile body detection is impossible if one of the sensors cannot detect a mobile body.

The present invention has an object of providing a mobile body detection device, a mobile body detection method, and a mobile body detection program that, in the case of detecting a mobile body using a plurality of sensors, can improve mobile body detection accuracy and prevent a mobile body detection failure.

Solution to Problem

A mobile body detection device according to the present invention includes: a first mobile body detection means which detects a position of a first mobile body from information acquired using a first sensor; a second mobile body detection means which detects a position of a second mobile body from information acquired using a second sensor; a first reliability calculation means which calculates first reliability of the first mobile body; a second reliability calculation means which calculates second reliability of the second mobile body; and a mobile body detection means which determines mobile body detection based on the position of the first mobile body and the position of the second mobile body, wherein the mobile body detection means: determines, in the case where the position of the first mobile body and the position of the second mobile body are approximately the same, that a mobile body is detected at the position; and determines, in the case where the position of the first mobile body and the position of the second mobile body are different and any of the first reliability and the second reliability exceeds a threshold, that a mobile body is detected at a position of a mobile body corresponding to the reliability exceeding the threshold.

A mobile body detection method according to the present invention includes: detecting a position of a first mobile body from information acquired using a first sensor; detecting a position of a second mobile body from information acquired using a second sensor; calculating first reliability of the first mobile body and second reliability of the second mobile body; determining, in the case where the position of the first mobile body and the position of the second mobile body are approximately the same, that a mobile body is detected at the position; and determining, in the case where the position of the first mobile body and the position of the second mobile body are different and any of the first reliability and the second reliability exceeds a threshold, that a mobile body is detected at a position of a mobile body corresponding to the reliability exceeding the threshold.

A mobile body detection program according to the present invention causes a computer to execute: a first mobile body detection process of detecting a position of a first mobile body from information acquired using a first sensor; a second mobile body detection process of detecting a position of a second mobile body from information acquired using a second sensor; a first reliability calculation process of calculating first reliability of the first mobile body; a second reliability calculation process of calculating second reliability of the second mobile body; and a mobile body detection process of determining mobile body detection based on the position of the first mobile body and the position of the second mobile body, wherein the mobile body detection process includes: determining, in the case where the position of the first mobile body and the position of the second mobile body are approximately the same, that a mobile body is detected at the position; and determining, in the case where the position of the first mobile body and the position of the second mobile body are different and any of the first reliability and the second reliability exceeds a threshold, that a mobile body is detected at a position of a mobile body corresponding to the reliability exceeding the threshold.

Advantageous Effects of Invention

According to the present invention, it is possible to, in the case of detecting a mobile body using a plurality of sensors, improve mobile body detection accuracy and prevent a mobile body detection failure.

DESCRIPTION OF EMBODIMENT

Exemplary embodiments of the present invention will be described below, with reference to the drawings.

Exemplary Embodiment 1

Figure 1:
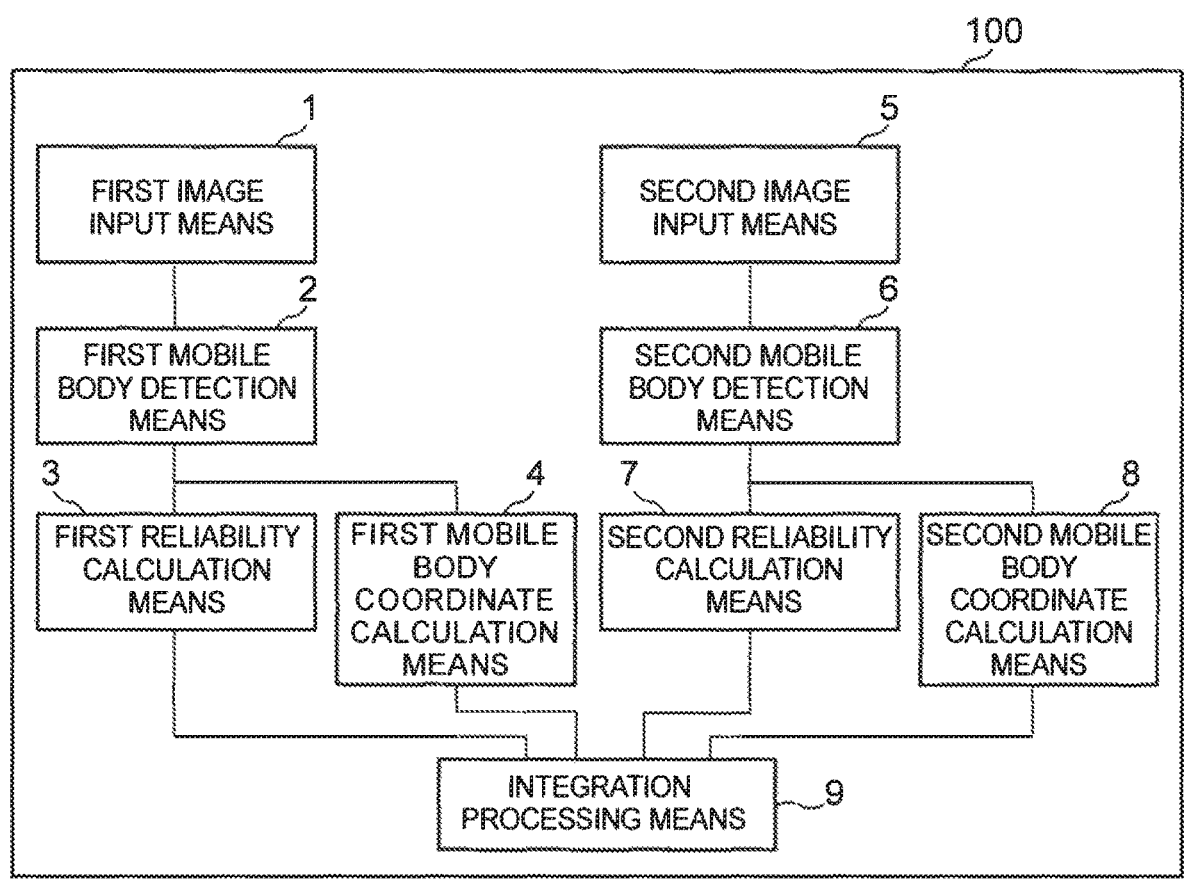
FIG. 1 is a block diagram depicting an example of a structure of Exemplary Embodiment 1 of a mobile body detection device according to the present invention.

FIG. 1 is a block diagram depicting an example of a structure of Exemplary Embodiment 1 of a mobile body detection device according to the present invention. A mobile body detection device 100 in this exemplary embodiment includes a first image input means 1, a first mobile body detection means 2, a first reliability calculation means 3, a first mobile body coordinate calculation means 4, a second image input means 5, a second mobile body detection means 6, a second reliability calculation means 7, a second mobile body coordinate calculation means 8, and an integration processing means 9.

The mobile body detection device 100 in this exemplary embodiment (more specifically, the first image input means 1 and the second image input means 5) receives input of respective images captured by two types of imaging means that differ in sensitivity wavelength (detection wavelength). That is, two types of imaging means having different properties are used in this exemplary embodiment.

Hereafter, the imaging device that captures the image input to the first image input means 1 is referred to as a first imaging device, and the imaging device that captures the image input to the second image input means 5 is referred to as a second imaging device. The first imaging means captures a camera image (hereafter referred to as a first input image) of a predetermined first detection wavelength, and the second imaging means captures a camera image (hereafter referred to as a second input image) of a predetermined second detection wavelength different from the first detection wavelength.

The camera image of the predetermined first detection wavelength may be, for example, a color visible image by an RGB camera, or a monochrome visible image with luminance covering wavelengths in a visible region.

The camera image of the predetermined second detection wavelength is, for example, a temperature image by a far-infrared camera, or a near-infrared image in the vicinity of wavelengths in a visible region.

Figure 2:
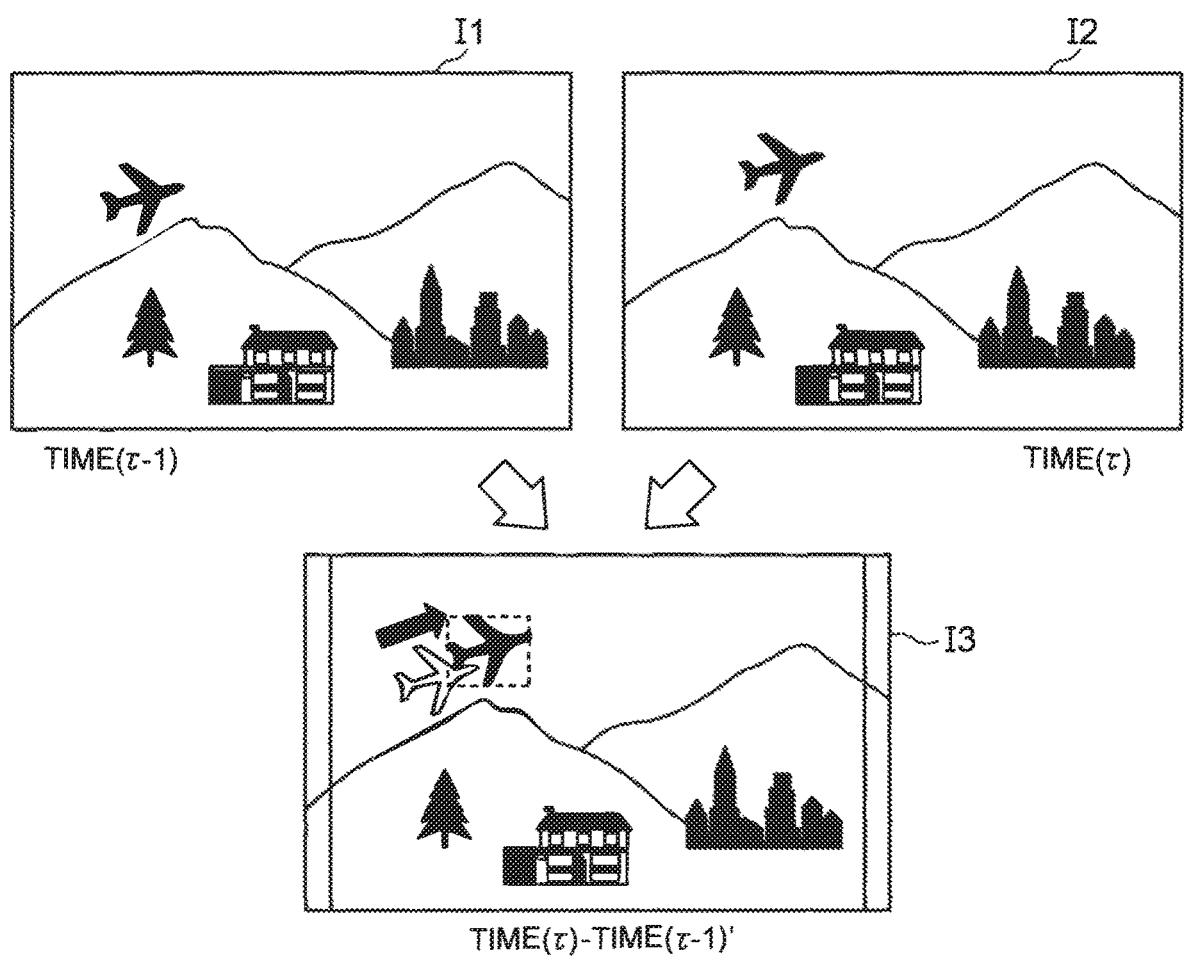
FIG. 2 is an explanatory diagram depicting an example of a method of detecting a mobile body.

The first mobile body detection means 2 detects a mobile body from the camera image input to the first image input means 1. The mobile body may be detected by any detection method. FIG. 2 is an explanatory diagram depicting an example of a method of detecting a mobile body. For example, the first mobile body detection means 2 calculates the difference between two images I1 and I2, i.e. the image I1 at input time τ and the immediately previous image I2 at input time (τ−1), of input images in chronological order, and moves the image at time (τ−1) so that the difference value will be minimum in the whole screen.

Next, the first mobile body detection means 2 divides the image at time τ into blocks of n×m size where n and m are given integers, and stores, as a block moving amount, the position at which the difference value in each block is minimum while moving the image with the minimum difference value in the whole screen to the center. The first mobile body detection means 2 then expands the block moving amount to a block different from the block moving amount in the surroundings, thus detecting a mobile body.

Alternatively, the first mobile body detection means 2 may detect a mobile body from an optical flow of the whole image and a local optical flow. The mobile body detected by the first mobile body detection means 2 is hereafter referred to as a first mobile body.

The second mobile body detection means 6 detects a mobile body from the camera image input to the second image input means 5. The mobile body may be detected by any detection method. The second mobile body detection means 6 may use the same method as the method by which the first mobile body detection means 2 detects the mobile body, or a different method. The mobile body detected by the second mobile body detection means 6 is hereafter referred to as a second mobile body.

The first reliability calculation means 3 calculates the reliability of the mobile body detected by the first mobile body detection means 2 (i.e. the first mobile body). The reliability calculated here is a measure representing the plausibility of the mobile body.

For example, suppose the first mobile body detection means 2 expands the region in which the mobile body is detected in chronological order and detects the mobile body over a plurality of frames. In this case, the first reliability calculation means 3 may calculate the reliability from the first input image corresponding to the number of successive frames. The first reliability calculation means 3 may binarize the region detected as the mobile body and pattern match the shape to calculate the similarity as the reliability.

The first mobile body coordinate calculation means 4 calculates the position of the first mobile body. For example, the first mobile body coordinate calculation means 4 may calculate, as rectangular coordinates, the position (coordinates) of the mobile body from the first input image so as to surround the region detected as the mobile body by the first mobile body detection means 2.

Thus, in this exemplary embodiment, the first image input means 1, the first mobile body detection means 2, and the first mobile body coordinate calculation means 4 cooperate to detect the position of the first mobile body using the information acquired by the first imaging means.

The second reliability calculation means 7 calculates the reliability of the mobile body detected by the second mobile body detection means 6 (i.e. the second mobile body). The second reliability calculation means 7 may calculate the reliability using the same method as the method by which the first reliability calculation means 3 calculates the reliability.

The second mobile body coordinate calculation means 8 calculates the position of the second mobile body. For example, the second mobile body coordinate calculation means 8 may calculate the position using the same method as the method by which the first mobile body coordinate calculation means 4 calculates the position of the mobile body.

Thus, in this exemplary embodiment, the second image input means 5, the second mobile body detection means 6, and the second mobile body coordinate calculation means 8 cooperate to detect the position of the second mobile body using the information acquired by the second imaging means.

The integration processing means 9 determines mobile body detection, based on the position of the first mobile body and the position of the second mobile body. Specifically, in the case where the position of the first mobile body and the position of the second mobile body are the same, the integration processing means 9 determines that a mobile body is detected at the position. In view of an error in calculated position between the images, the integration processing means 9 may determine that the position of the first mobile body and the position of the second mobile body are the same in the case where the difference between the position of the first mobile body and the position of the second mobile body is within a predetermined range. Hereafter, the expression that the two positions are "approximately the same" is used to indicate not only the case where the positions are completely the same but also the case where the difference between the positions is within a predetermined error range.

Further, even when the position of the first mobile body and the position of the second mobile body are different, in the case where one of the first reliability and the second reliability exceeds a threshold, the integration processing means 9 determines that a mobile body is detected at the position of the mobile body corresponding to the reliability exceeding the threshold.

For example, suppose the position of the mobile body detected from the second input image is not at the position of the mobile body detected from the first input image. In this case, the integration processing means 9 determines whether the reliability of the mobile body at the position coordinates of the mobile body according to the first image input is greater than a predetermined threshold $\alpha$. In the case where the reliability is greater than the threshold $\alpha$, the integration processing means 9 determines that a mobile body is present at the position of the mobile body detected from the first input image, and detects the mobile body. The threshold $\alpha$ is, for example, set beforehand according to an object detection method by the visible camera.

For example, suppose the position of the mobile body detected from the first input image is not at the position of the mobile body detected from the second input image. In this case, the integration processing means 9 determines whether the reliability of the mobile body at the position coordinates of the mobile body according to the second image input is greater than a predetermined threshold $\beta$. In the case where the reliability is greater than the threshold $\beta$, the integration processing means 9 determines that a mobile body is present at the position of the mobile body detected from the second input image, and detects the mobile body. The threshold $\beta$ is, for example, set beforehand according to an object detection method by the temperature camera or near-infrared camera. The thresholds $\alpha$ and $\beta$ may be the same value or different values.

There is a possibility that the position of the first mobile body and the position of the second mobile body are different and both reliabilities are greater than the predetermined thresholds. In such a case, the integration processing means 9 determines that a mobile body is present at the position detected from each image, and detects these mobile bodies. That is, one mobile body is detected from each image, i.e. it is determined that a total of two mobile bodies are present.

The first image input means 1, the first mobile body detection means 2, the first reliability calculation means 3, the first mobile body coordinate calculation means 4, the second image input means 5, the second mobile body detection means 6, the second reliability calculation means 7, the second mobile body coordinate calculation means 8, and the integration processing means 9 are implemented by a CPU of a computer operating according to a program (mobile body detection program).

For example, the program may be stored in a storage unit (not depicted) in the mobile body detection device 100, with the CPU reading the program and, according to the program, operating as the first image input means 1, the first mobile body detection means 2, the first reliability calculation means 3, the first mobile body coordinate calculation means 4, the second image input means 5, the second mobile body detection means 6, the second reliability calculation means 7, the second mobile body coordinate calculation means 8, and the integration processing means 9.

The first image input means 1, the first mobile body detection means 2, the first reliability calculation means 3, the first mobile body coordinate calculation means 4, the second image input means 5, the second mobile body detection means 6, the second reliability calculation means 7, the second mobile body coordinate calculation means 8, and the integration processing means 9 may each be implemented by dedicated hardware.

Figure 3:
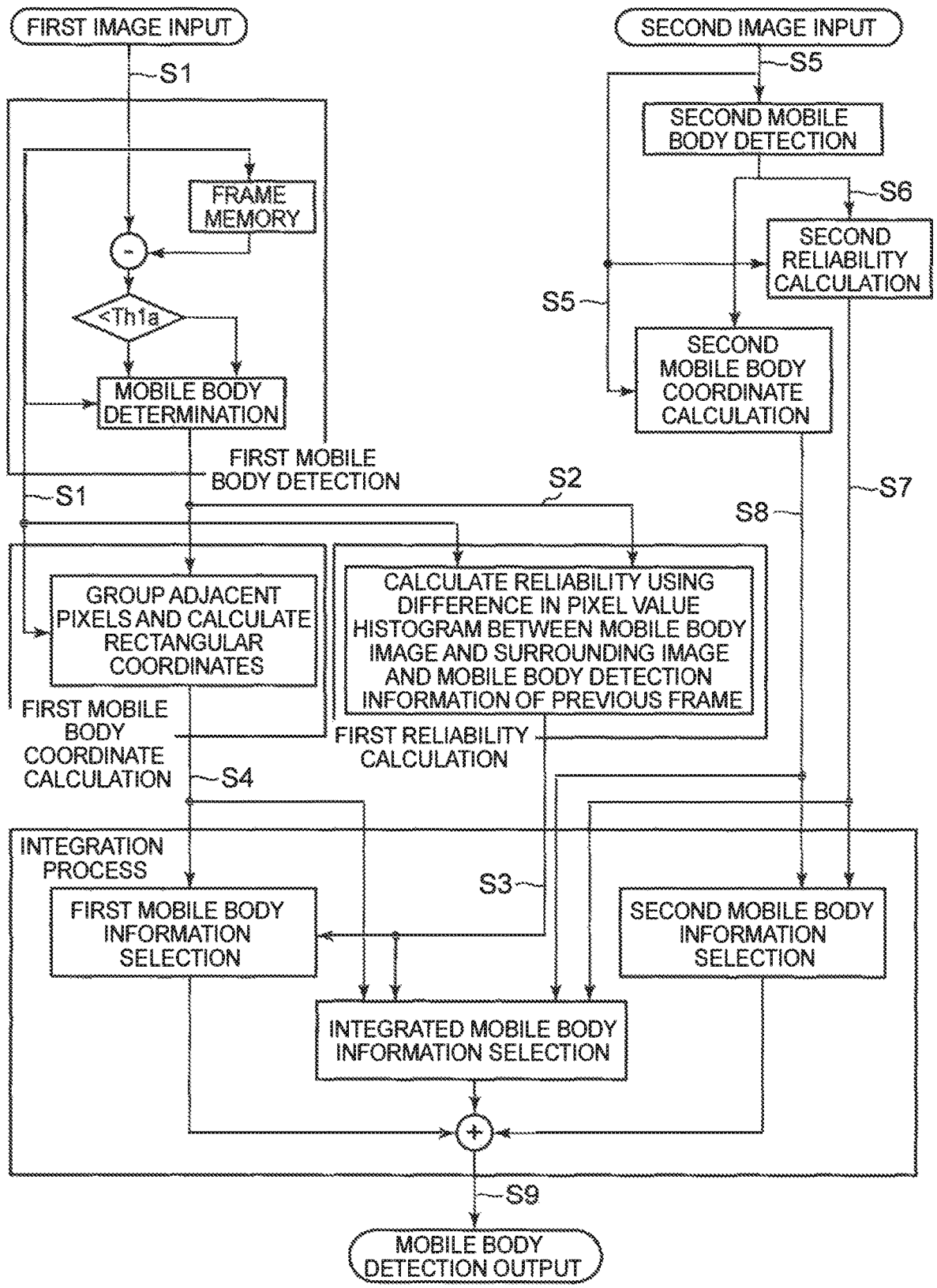
FIG. 3 is an explanatory diagram depicting an example of operation of the mobile body detection device in Exemplary Embodiment 1.

FIG. 3 is an explanatory diagram depicting an example of operation of the mobile body detection device 100 in Exemplary Embodiment 1. The two types of imaging means differ in sensitivity wavelength. The first image input means 1 receives input of a camera image of the predetermined first detection wavelength. Image data S1 of the input camera image is provided to the first mobile body detection means 2, and the first mobile body detection means 2 outputs mobile body detection data S2 in a first mobile body detection process.

Suppose the region of the mobile body detection data S2 detected as a mobile body by the first mobile body detection means 2 is expanded in chronological order, and the mobile body is detected over a plurality of frames. In this case, the first reliability calculation means 3 calculates reliability S3 according to the first image input corresponding to the number of successive frames. For example, the first reliability calculation means 3 calculates the reliability using the difference in pixel value histogram between the image of the mobile body and its surrounding image and mobile body detection information of the previous frame. The first reliability calculation means 3 may binarize the region detected as the mobile body and pattern match the shape to calculate the similarity as the reliability S3.

The first mobile body coordinate calculation means 4 calculates the position coordinates S4 of the mobile body according to the first image input on the screen so as to surround the region detected as the mobile body by the first mobile body detection means 2, in a first mobile body coordinate calculation process.

Likewise, the second image input means 5 receives input of a camera image of the predetermined second detection wavelength. Image data S5 of the input camera image is provided to the second mobile body detection means 6, and the second mobile body detection means 6 outputs mobile body detection data S6.

Suppose the region of the mobile body detection data S6 detected as a mobile body by the second mobile body detection means 6 is expanded in chronological order, and the mobile body is detected over a plurality of frames. In this case, the second reliability calculation means 7 calculates reliability S7 according to the second image input corresponding to the number of successive frames. The second reliability calculation means 7 may binarize the region detected as the mobile body and pattern match the shape to calculate the similarity as the reliability S7.

The second mobile body coordinate calculation means 8 calculates the position coordinates S8 of the mobile body according to the second image input on the screen so as to surround the region of the mobile body detection data S6 detected as the mobile body by the second mobile body detection means 6.

The integration processing means 9 receives the reliability S3 of the mobile body and the position coordinates S4 of the mobile body according to the first image input and the reliability S7 of the mobile body and the position coordinates S8 of the mobile body according to the second image input. In the case where the position coordinates S4 and the position coordinates S8 are approximately the same, the integration processing means 9 determines that a mobile body is present at the position of the coordinates, and detects a mobile body S9.

In the case where the position coordinates S8 do not match the position coordinates S4 and the reliability S3 of the mobile body detected at the position coordinates S4 is greater than the predetermined threshold $\alpha$, the integration processing means 9 determines that a mobile body is present at the position coordinates S4, and detects the mobile body S9. In the case where the position coordinates S4 do not match the position coordinates S8 and the reliability S7 of the mobile body detected at the position coordinates S8 is greater than the predetermined threshold $\beta$, the integration processing means 9 determines that a mobile body is present at the coordinates position S8, and detects a mobile body S9.

Figure 4:
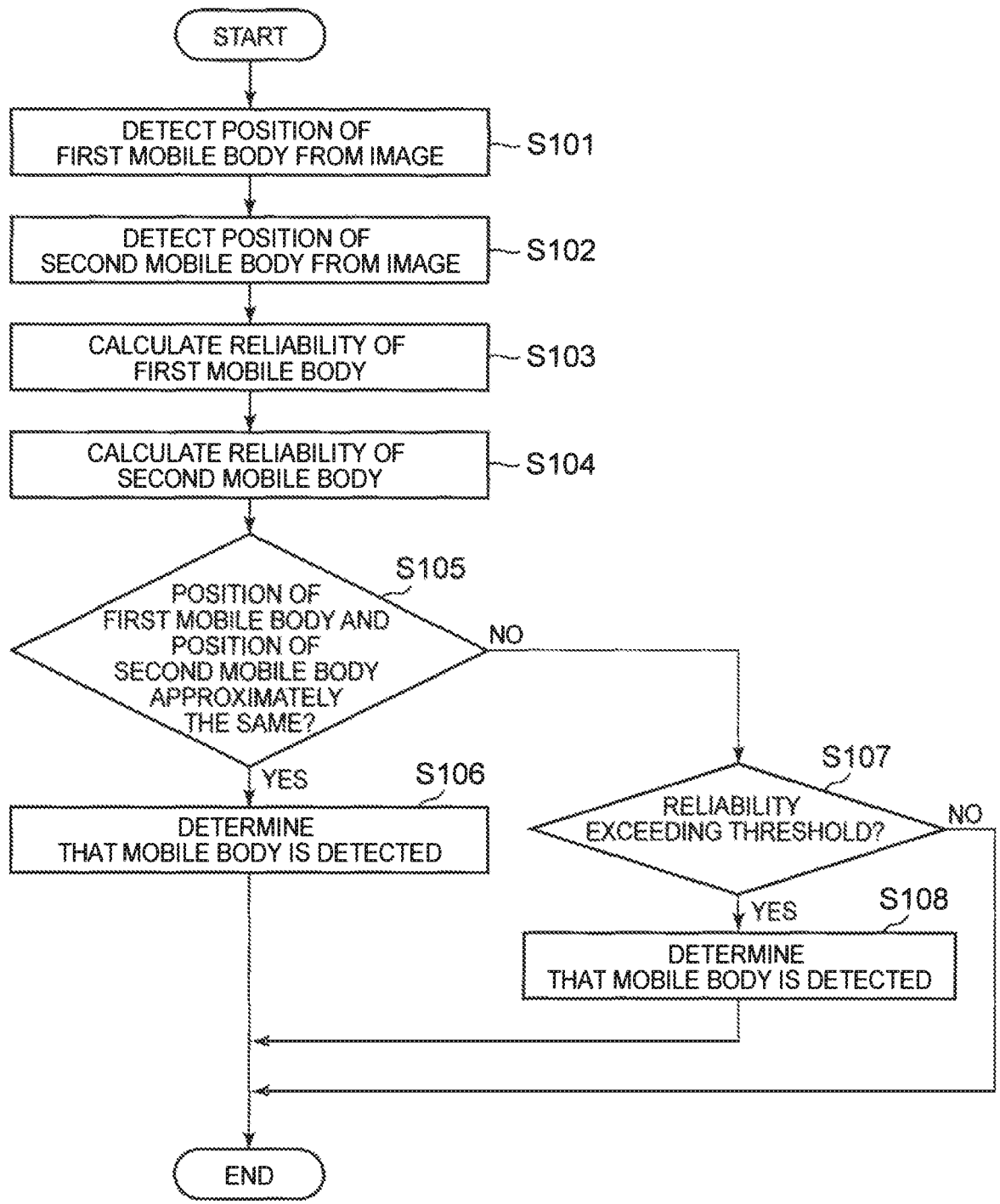
FIG. 4 is a flowchart depicting an example of operation of the mobile body detection device in Exemplary Embodiment 1.

FIG. 4 is a flowchart depicting an example of operation of the mobile body detection device 100 in Exemplary Embodiment 1. The first mobile body coordinate calculation means 4 detects the position of the first mobile body (step S101). The second mobile body coordinate calculation means 8 detects the position of the second mobile body (step S102). In this exemplary embodiment, respective images captured using two types of sensors (imaging means) having different properties are used in the detection of the mobile body positions.

Specifically, a first sensor is the first imaging means for capturing an image of the predetermined first detection wavelength (e.g. visible light wavelength), and a second sensor is the second imaging means for capturing an image of the predetermined second detection wavelength (e.g. near-infrared ray wavelength or far-infrared ray wavelength) different from the first detection wavelength.

The first reliability calculation means 3 calculates the first reliability of the first mobile body (step S103). Likewise, the second reliability calculation means 7 calculates the second reliability of the second mobile body (step S104). The integration processing means 9 determines whether the position of the first mobile body and the position of the second mobile body are approximately the same (step S105).

In the case where the position of the first mobile body and the position of the second mobile body are approximately the same (step S105: Yes), the integration processing means 9 determines that a mobile body is detected at the position (step S106). In the case where the position of the first mobile body and the position of the second mobile body are different (step S105: No), the integration processing means 9 determines whether any of the first reliability and the second reliability exceeds a threshold (step S107). In the case where the reliability exceeds the threshold (step S107: Yes), the integration processing means 9 determines that a mobile body is detected at the position of the mobile body corresponding to the reliability exceeding the threshold (step S108). In the case where no reliability exceeds the threshold (step S107: No), the integration processing means 9 ends the process without determining that a mobile body is detected.

As described above, in this exemplary embodiment, the first mobile body coordinate calculation means 4 detects the position of the first mobile body, and the second mobile body coordinate calculation means 8 detects the position of the second mobile body. Further, the first reliability calculation means 3 calculates the first reliability of the first mobile body, and the second reliability calculation means 7 calculates the second reliability of the second mobile body. The integration processing means 9 then determines mobile body detection based on the position of the first mobile body and the position of the second mobile body.

Specifically, in the case where the position of the first mobile body and the position of the second mobile body are approximately the same, the integration processing means 9 determines that a mobile body is detected at the position. In the case where the position of the first mobile body and the position of the second mobile body are different and one of the first reliability and the second reliability exceeds the threshold, the integration processing means 9 determines that a mobile body is detected at the position of the mobile body corresponding to the reliability exceeding the threshold.

With such a structure, in the case of detecting a mobile body using a plurality of sensors, mobile body detection accuracy can be improved and a mobile body detection failure can be prevented.

Exemplary Embodiment 2

Figure 5:
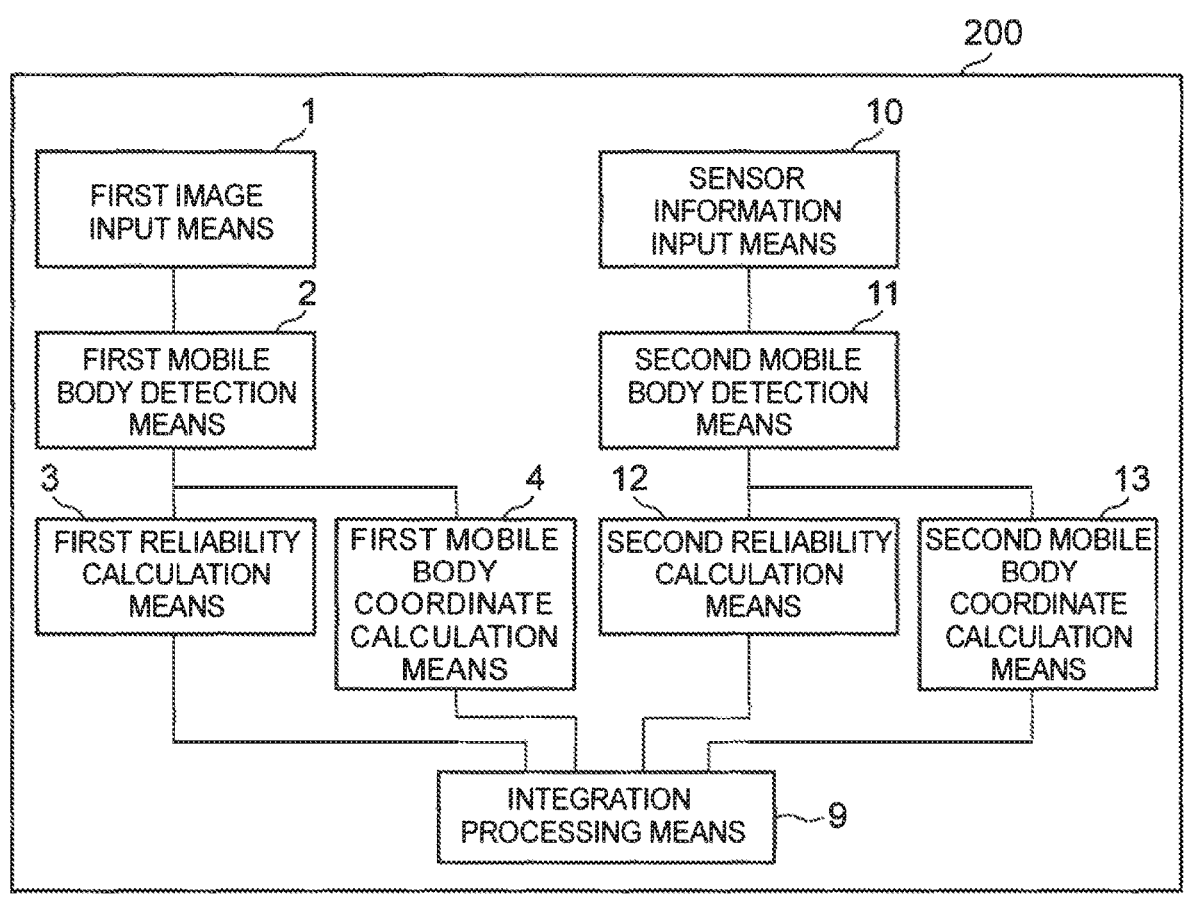
FIG. 5 is a block diagram depicting an example of a structure of Exemplary Embodiment 2 of a mobile body detection device according to the present invention.

Exemplary Embodiment 2 of a mobile body detection device according to the present invention will be described below. FIG. 5 is a block diagram depicting an example of a structure of Exemplary Embodiment 2 of a mobile body detection device according to the present invention. The same components as those in Exemplary Embodiment 1 are given the same reference signs as in FIG. 1, and their description is omitted.

A mobile body detection device 200 in this exemplary embodiment includes the first image input means 1, the first mobile body detection means 2, the first reliability calculation means 3, the first mobile body coordinate calculation means 4, a sensor information input means 10, a second mobile body detection means 11, a second reliability calculation means 12, a second mobile body coordinate calculation means 13, and the integration processing means 9.

That is, the mobile body detection device 200 in this exemplary embodiment differs from the mobile body detection device 100 in Exemplary Embodiment 1 in that the sensor information input means 10, the second mobile body detection means 11, the second reliability calculation means 12, and the second mobile body coordinate calculation means 13 are included instead of the second image input means 5, the second mobile body detection means 6, the second reliability calculation means 7, and the second mobile body coordinate calculation means 8.

Exemplary Embodiment 1 describes the case where two types of imaging means that differ in sensitivity wavelength are used as two types of sensors having different properties. This exemplary embodiment describes the case where an imaging means for capturing an image and an acoustic sensor are used as two types of sensors having different properties.

That is, the mobile body detection device 200 in this exemplary embodiment (more specifically, the first image input means 1 and the sensor information input means 10) receives input of a camera image captured by the imaging means and acoustic data detected by the acoustic sensor. In this exemplary embodiment, a plurality of acoustic sensors are used to form a microphone array. The microphone array is, for example, composed of at least four microphones.

The first image input means 1, the first mobile body detection means 2, the first reliability calculation means 3, and the first mobile body coordinate calculation means 4 have the same structures as those in Exemplary Embodiment 1.

The camera image in this exemplary embodiment may be, for example, a color visible image by an RGB camera, or a monochrome visible image with luminance covering wavelengths in a visible region.

The sensor information input means 10 receives input of the acoustic data detected by the microphone array in which the plurality of microphones are arranged.

The second mobile body detection means 11 detects a mobile body from the acoustic data input to the sensor information input means 10. For example, the second mobile body detection means 11 subjects the acoustic data input from a predetermined number of microphones in a predetermined arrangement to frequency analysis per unit time by Fourier transformation to analyze the sound source direction, the level, etc., thus detecting a mobile body.

Alternatively, the second mobile body detection means 11 may analyze the input acoustic data in chronological order, and detect a mobile body using a change in acoustic level.

The second reliability calculation means 12 calculates the reliability of the second mobile body detected by the second mobile body detection means 11. Specifically, the second reliability calculation means 12 calculates the reliability of the sound source by specifying the movement of the sound source based on the feature of the sound source.

For example, suppose the second mobile body detection means 11 expands the region in which the mobile body is detected in chronological order and detects the mobile body over a plurality of frames. In this case, the second reliability calculation means 12 may calculate the reliability from the acoustic data corresponding to the number of successive frames. The second reliability calculation means 12 may perform pattern matching on the frequency pattern of the acoustic data detected as a mobile body and an acoustic pattern registered beforehand as a mobile body to calculate the similarity as the reliability.

The second mobile body coordinate calculation means 13 calculates the position of the second mobile body. For example, the second mobile body coordinate calculation means 13 may calculate the position (coordinates) of the mobile body from the first input image (specifically, the image input to the first image input means 1) so as to surround the region (the position of the sound source) detected as the position of the second mobile body by the second mobile body detection means 11.

The integration processing means 9 determines mobile body detection based on the position of the first mobile body and the position of the second mobile body, as in Exemplary Embodiment 1. Specifically, in the case where the position of the first mobile body and the position of the second mobile body are approximately the same, the integration processing means 9 determines that a mobile body is detected at the position.

Further, even when the position of the first mobile body and the position of the second mobile body are different, in the case where the first reliability exceeds a threshold, the integration processing means 9 determines that a mobile body is detected at the position of the mobile body corresponding to the first reliability.

The first image input means 1, the first mobile body detection means 2, the first reliability calculation means 3, the first mobile body coordinate calculation means 4, the sensor information input means 10, the second mobile body detection means 11, the second reliability calculation means 12, the second mobile body coordinate calculation means 13, and the integration processing means 9 are implemented by a CPU of a computer operating according to a program (mobile body detection program).

Figure 6:
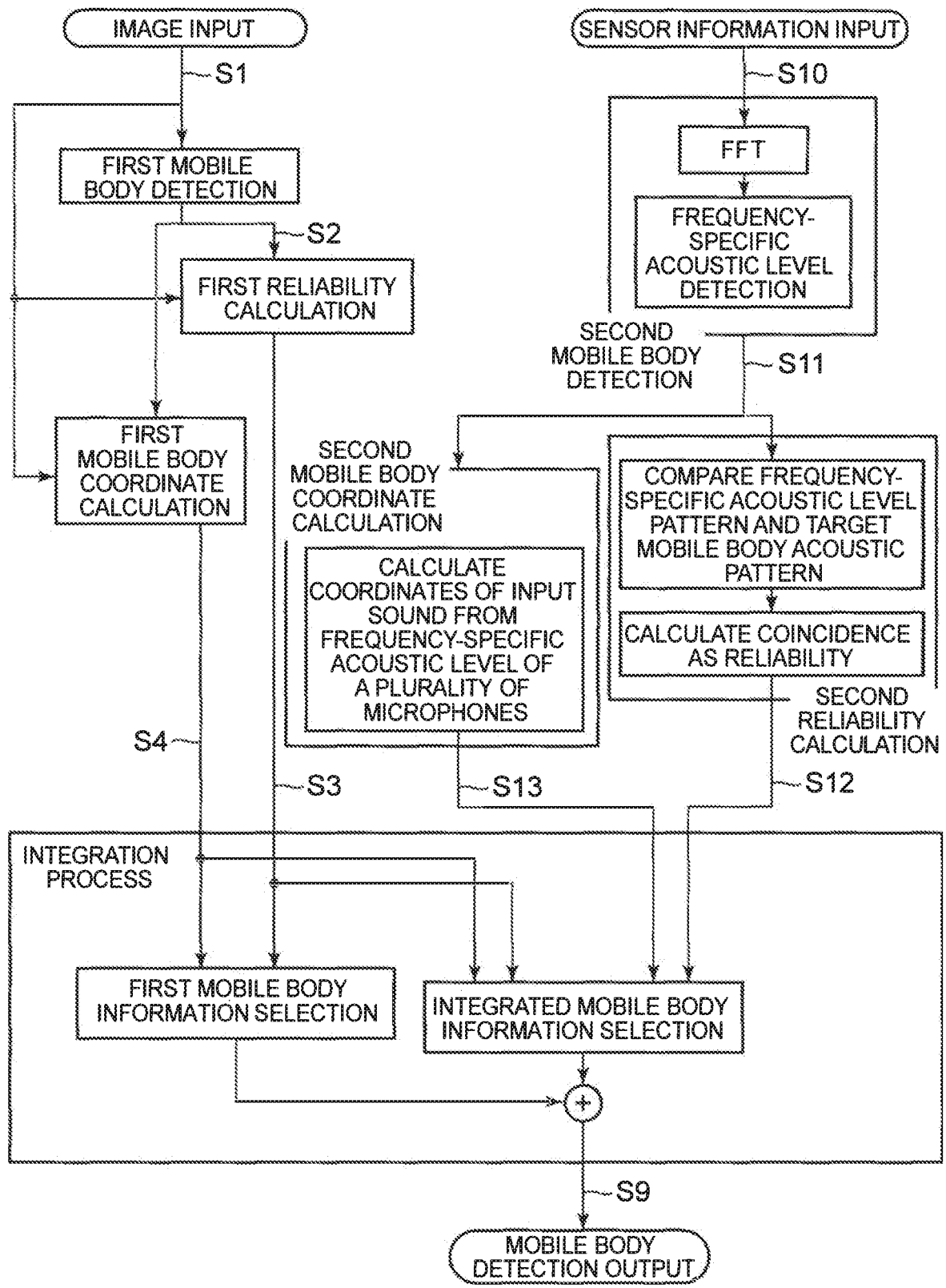
FIG. 6 is an explanatory diagram depicting an example of operation of the mobile body detection device in Exemplary Embodiment 2.

FIG. 6 is an explanatory diagram depicting an example of operation of the mobile body detection device 200 in Exemplary Embodiment 2. The operations of the first image input means 1, the first mobile body detection means 2, the first reliability calculation means 3, and the first mobile body coordinate calculation means 4 are the same as those in FIG. 3.

The sensor information input means 10 receives input of acoustic data S10 from the microphone array in which the plurality of microphones are arranged. The input acoustic data S10 is provided to the second mobile body detection means 11, and the second mobile body detection means 11 outputs mobile body detection data S11 in a second mobile body detection process.

Suppose the region of the mobile body detection data S11 detected as a mobile body by the second mobile body detection means 11 is expanded in chronological order, and the mobile body is detected over a plurality of frames. In this case, the second reliability calculation means 12 calculates reliability S12 according to the acoustic data input corresponding to the number of successive frames. The second reliability calculation means 12 may perform pattern matching on the frequency pattern of the acoustic data detected as a mobile body and an acoustic pattern registered beforehand as a mobile body to calculate the similarity as the reliability S12. The second reliability calculation means 12 may compare the frequency-specific acoustic level pattern and the target mobile body acoustic pattern, and calculate the coincidence as the reliability.

The second mobile body coordinate calculation means 13 calculates the position coordinates S13 of the mobile body on the screen of the image data so as to surround the region detected as the mobile body.

The integration processing means 9 receives the reliability S3 of the mobile body and the position coordinates S4 of the mobile body according to the first image input and the reliability S12 of the mobile body and the position coordinates S13 of the mobile body according to the acoustic input. In the case where the position coordinates S4 and the position coordinates S13 are approximately the same, the integration processing means 9 determines that a mobile body is present at the position of the coordinates, and detects a mobile body S9.

In the case where the position coordinates S13 does not match the position coordinates S4 and the reliability S3 of the mobile body detected at the position coordinates S4 is greater than the predetermined threshold α, the integration processing means 9 determines that a mobile body is present at the position coordinates S4, and detects the mobile body S9.

Figure 7:
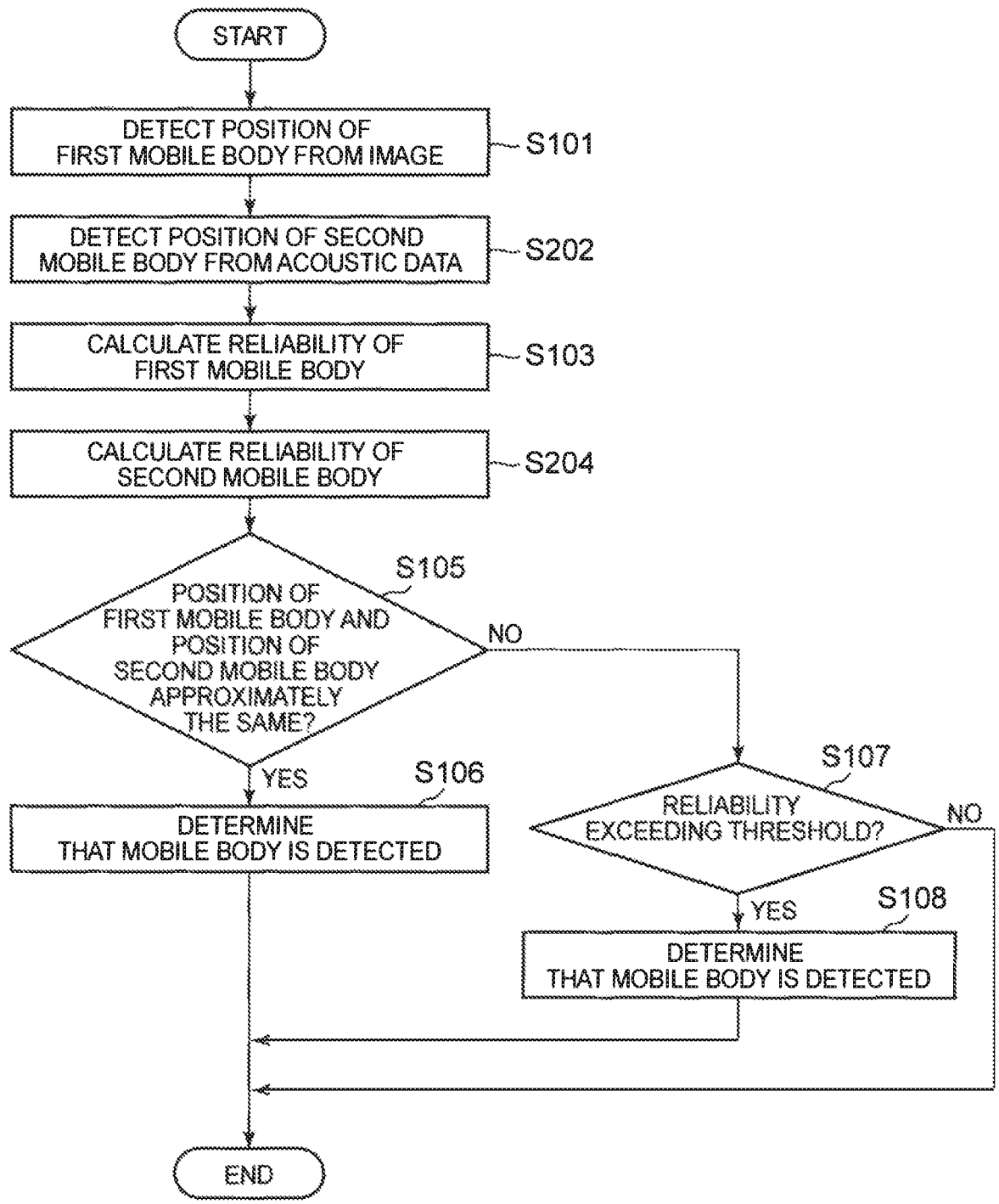
FIG. 7 is a flowchart depicting an example of operation of the mobile body detection device in Exemplary Embodiment 2.

FIG. 7 is a flowchart depicting an example of operation of the mobile body detection device 200 in Exemplary Embodiment 2. The first mobile body coordinate calculation means 4 detects the position of the first mobile body (step S101). The second mobile body coordinate calculation means 13 detects the position of the second mobile body (step S202).

Specifically, a first sensor for detecting the position of the first mobile body is the imaging means for capturing an image of the predetermined first detection wavelength (e.g. visible light wavelength), and a second sensor for detecting the position of the second mobile body is the microphone array including a plurality of acoustic sensors. That is, the first mobile body coordinate calculation means 4 detects the position of the first mobile body from the image captured by the imaging means, and the second mobile body coordinate calculation means 13 detects, as the position of the second mobile body, the position of the sound source from the acoustic data detected by the microphone array.

The first reliability calculation means 3 calculates the first reliability of the first mobile body (step S103). Likewise, the second reliability calculation means 12 calculates the second reliability of the second mobile body (step S204). Specifically, the second reliability calculation means 12 calculates the second reliability of the sound source by specifying the movement of the sound source based on the feature of the sound source.

The subsequent process by which the integration processing means 9 detects a mobile body is the same as the process from step S105 to step S108 in FIG. 4.

As described above, in this exemplary embodiment, the first mobile body coordinate calculation means 4 detects the position of the first mobile body from the image captured by the imaging means for capturing an image of the predetermined first detection wavelength, and the second mobile body coordinate calculation means 13 detects, as the position of the second mobile body, the position of the sound source from the acoustic data detected by the microphone array including a plurality of acoustic sensors. The second reliability calculation means 12 calculates the second reliability of the sound source, by specifying the movement of the sound source based on the feature of the sound source.

With such a structure, too, in the case of detecting a mobile body using a plurality of sensors, mobile body detection accuracy can be improved and a mobile body detection failure can be prevented.

Exemplary Embodiment 3

Figure 8:
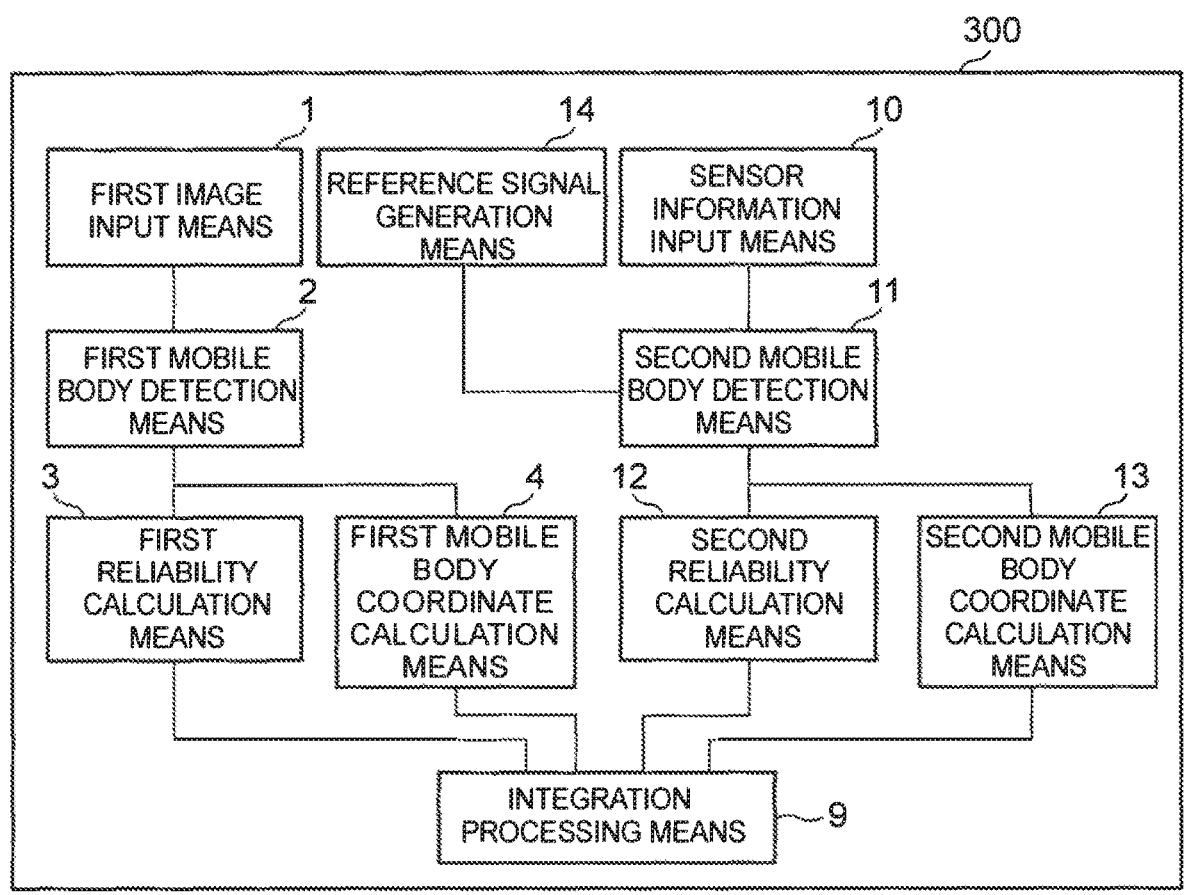
FIG. 8 is a block diagram depicting an example of a structure of Exemplary Embodiment 3 of a mobile body detection device according to the present invention.

Exemplary Embodiment 3 of a mobile body detection device according to the present invention will be described below. FIG. 8 is a block diagram depicting an example of a structure of Exemplary Embodiment 3 of a mobile body detection device according to the present invention. The same components as those in Exemplary Embodiment 2 are given the same reference signs as in FIG. 5, and their description is omitted.

A mobile body detection device 300 in this exemplary embodiment includes the first image input means 1, the first mobile body detection means 2, the first reliability calculation means 3, the first mobile body coordinate calculation means 4, the sensor information input means 10, the second mobile body detection means 11, the second reliability calculation means 12, the second mobile body coordinate calculation means 13, a reference signal generation means 14, and the integration processing means 9.

That is, the mobile body detection device 300 in this exemplary embodiment differs from the mobile body detection device 200 in Exemplary Embodiment 2 in that the reference signal generation means 14 is further included.

Exemplary Embodiment 2 describes the case where an imaging means for capturing an image and an acoustic sensor are used as two types of sensors having different properties. This exemplary embodiment describes the case where an imaging means for capturing an image and a radar for receiving a reflection wave of a transmitted electromagnetic wave are used as two types of sensors having different properties. Thus, an object detection method by a radar system is used in this exemplary embodiment.

That is, the mobile body detection device 300 in this exemplary embodiment (more specifically, the first image input means 1 and the sensor information input means 10) receives a camera image captured by the imaging means and reflection data represented by a reflection wave detected by the radar for receiving a reflection wave corresponding to a transmitted electromagnetic wave of a predetermined wavelength.

The first image input means 1, the first mobile body detection means 2, the first reliability calculation means 3, and the first mobile body coordinate calculation means 4 have the same structures as those in Exemplary Embodiment 1.

The camera image in this exemplary embodiment may be, for example, a color visible image by an RGB camera, or a monochrome visible image with luminance covering wavelengths in a visible region.

The reference signal generation means 14 outputs a reference signal (electromagnetic wave) of a predetermined wavelength. This wavelength is hereafter referred to as a third wavelength.

The sensor information input means 10 in this exemplary embodiment receives input of the reflection data represented by the reflection wave of the second mobile body received by the radar. The radar used in this exemplary embodiment receives a reflection wave of an electromagnetic wave output from the reference signal generation means 14 by a radar antenna, and inputs it to the sensor information input means 10.

The second mobile body detection means 11 detects a mobile body from the reflection data input to the sensor information input means 10. For example, the second mobile body detection means 11 may detect the distance from the radar antenna and the direction, from the phase difference between the reference signal output from the reference signal generation means 14 and the received reflection data.

Alternatively, the second mobile body detection means 11 may analyze the input reflection data in chronological order, and detect a mobile body using a change in signal level in addition to the phase difference of the reflection wave.

The second reliability calculation means 12 calculates the reliability of the second mobile body detected by the second mobile body detection means 11. Specifically, the second reliability calculation means 12 calculates the second reliability by specifying the transition of the strength of the reflection wave based on the feature of the reflection data.

For example, suppose the second mobile body detection means 11 expands the region in which the mobile body is detected in chronological order and detects the mobile body over a plurality of frames. In this case, the second reliability calculation means 12 may calculate the reliability from the reflection data corresponding to the number of successive frames.

The second reliability calculation means 12 may perform pattern matching on the strength distribution of the reflection data detected as a mobile body and a reflection pattern registered beforehand as a mobile body to calculate the similarity as the reliability.

The second mobile body coordinate calculation means 13 calculates the position of the second mobile body. For example, the second mobile body coordinate calculation means 13 may calculate the position (coordinates) of the mobile body from the first input image (specifically, the image input to the first image input means 1) so as to surround the region detected as the position of the second mobile body by the second mobile body detection means 11.

The integration processing means 9 determines mobile body detection based on the position of the first mobile body and the position of the second mobile body, as in Exemplary Embodiment 1. Specifically, in the case where the position of the first mobile body and the position of the second mobile body are approximately the same, the integration processing means 9 determines that a mobile body is detected at the position.

Further, even when the position of the first mobile body and the position of the second mobile body are different, in the case where the first reliability exceeds a threshold, the integration processing means 9 determines that a mobile body is detected at the position of the mobile body corresponding to the first reliability.

Figure 9:
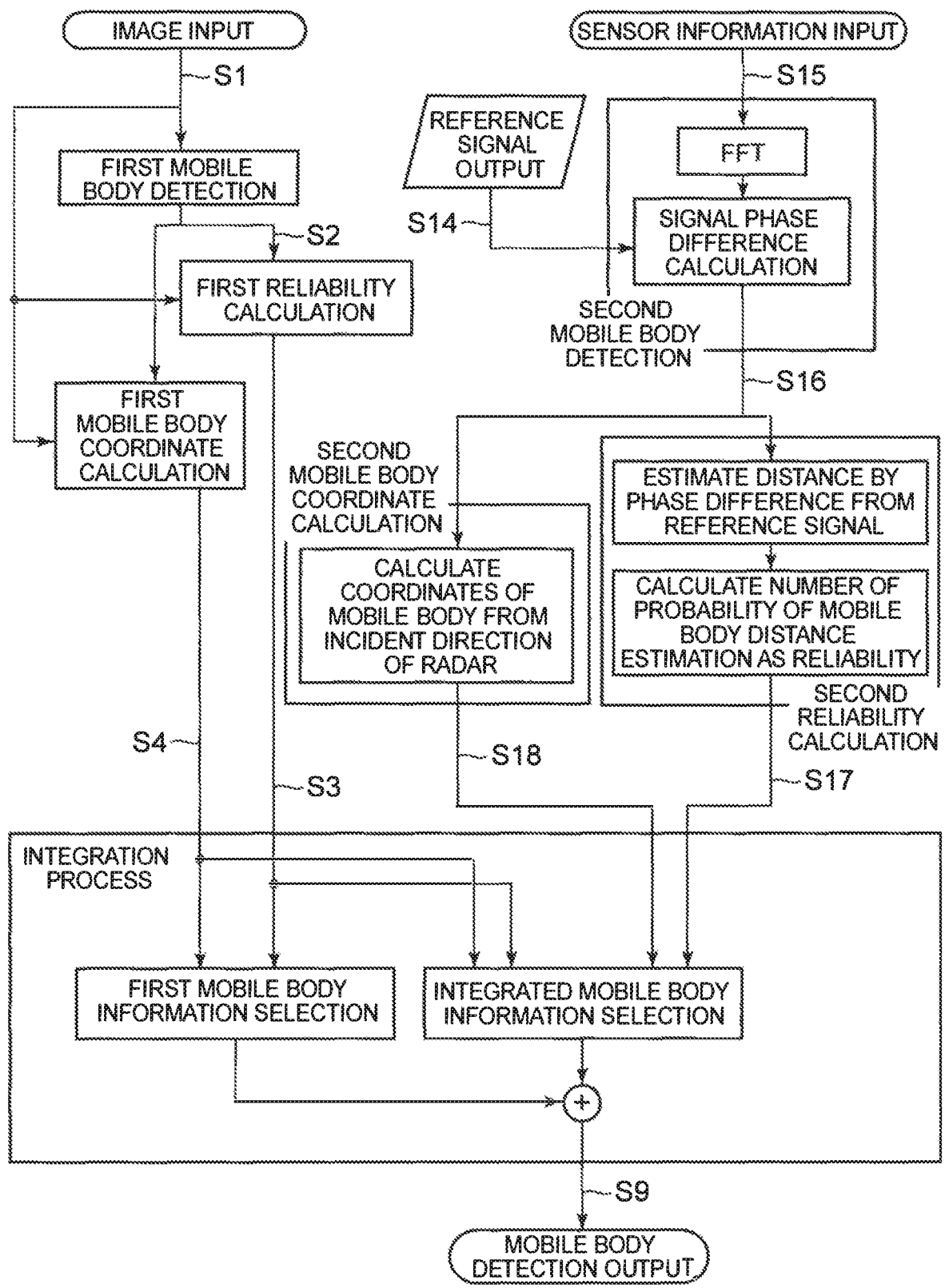
FIG. 9 is an explanatory diagram depicting an example of operation of the mobile body detection device in Exemplary Embodiment 3.

FIG. 9 is an explanatory diagram depicting an example of operation of the mobile body detection device 300 in Exemplary Embodiment 3. The operations of the first image input means 1, the first mobile body detection means 2, the first reliability calculation means 3, and the first mobile body coordinate calculation means 4 are the same as those in FIG. 1.

The reference signal generation means 14 outputs the reference signal. The sensor information input means 10 receives input of reflection data S15 represented by the reflection wave of the electromagnetic wave received by the radar antenna. The input reflection data S15 is provided to the second mobile body detection means 11, and the second mobile body detection means 11 outputs mobile body detection data S16 in a second mobile body detection process. For example, the second mobile body detection means 11 detects the distance from the radar antenna and the direction, from the phase difference between the reference signal and the received reflection data.

Suppose the region of the mobile body detection data S16 detected as a mobile body by the second mobile body detection means 11 is expanded in chronological order, and the mobile body is detected over a plurality of frames. In this case, the second reliability calculation means 12 calculates reliability S17 according to the reflection data input corresponding to the number of successive frames. The second reliability calculation means 12 may perform pattern matching on the strength distribution of the reflection data detected as a mobile body and a reflection pattern registered beforehand as a mobile body to calculate the similarity as the reliability S17.

The second mobile body coordinate calculation means 13 calculates the position coordinates S18 of the mobile body on the screen of the image data so as to surround the region detected as the mobile body.

The integration processing means 9 receives the reliability S3 of the mobile body and the position coordinates S4 of the mobile body according to the first image input and the reliability S17 of the mobile body and the position coordinates S18 of the mobile body according to the reflection wave input. In the case where the position coordinates S4 and the position coordinates S18 are approximately the same, the integration processing means 9 determines that a mobile body is present at the position of the coordinates, and detects a mobile body S9.

In the case where the position coordinates S18 does not match the position coordinates S4 and the reliability S3 of the mobile body detected at the position coordinates S4 is greater than the predetermined threshold α, the integration processing means 9 determines that a mobile body is present at the position coordinates S4, and detects the mobile body S9.

Figure 10:
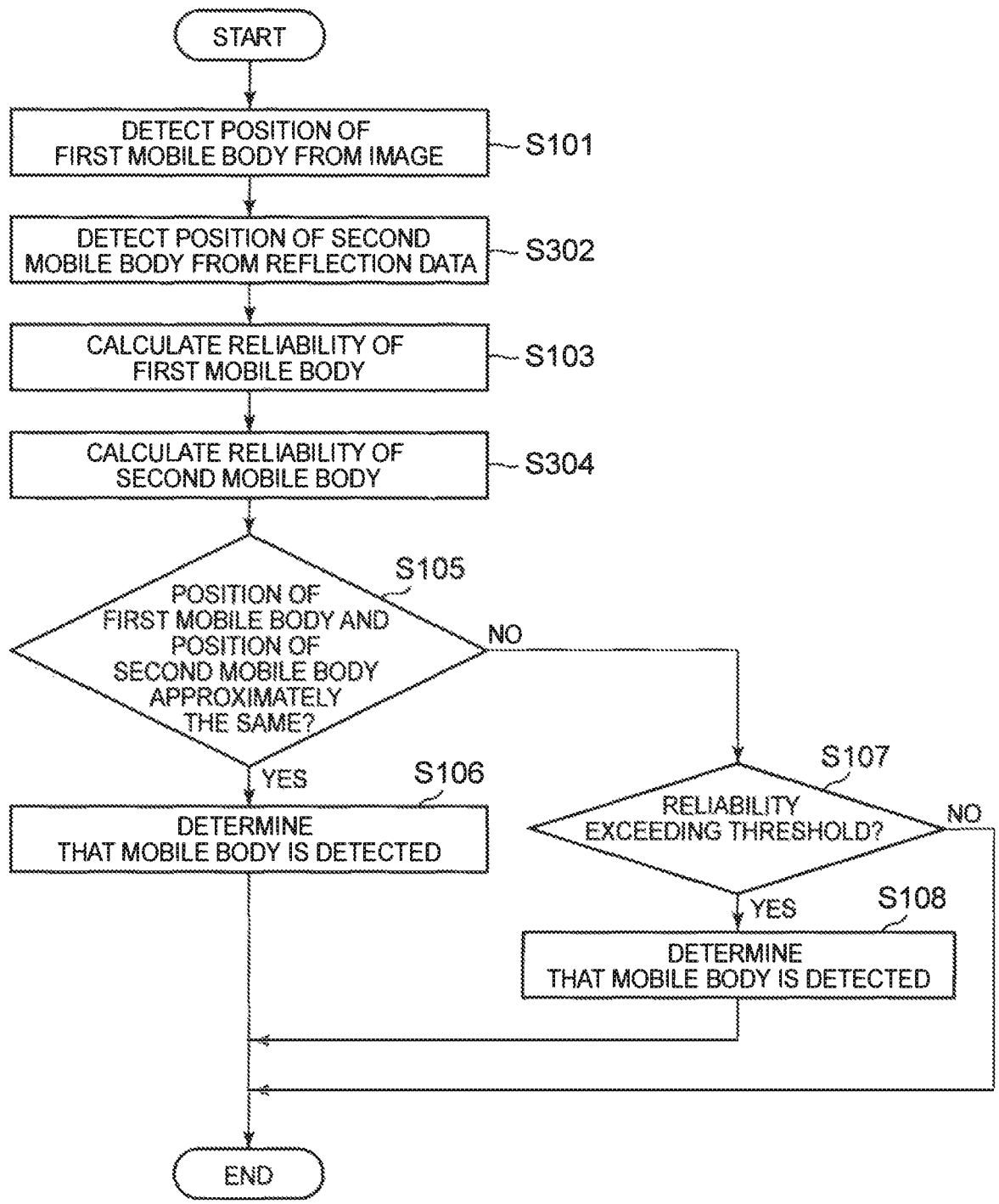
FIG. 10 is a flowchart depicting an example of operation of the mobile body detection device in Exemplary Embodiment 3.

FIG. 10 is a flowchart depicting an example of operation of the mobile body detection device 300 in Exemplary Embodiment 3. The first mobile body coordinate calculation means 4 detects the position of the first mobile body (step S101). The second mobile body coordinate calculation means 13 detects the position of the second mobile body (step S302).

Specifically, a first sensor for detecting the position of the first mobile body is the imaging means for capturing an image of the predetermined first detection wavelength (e.g. visible light wavelength), and a second sensor for detecting the position of the second mobile body is the radar for receiving a reflection wave corresponding to a transmitted electromagnetic wave of the predetermined third wavelength.

That is, the first mobile body coordinate calculation means 4 detects the position of the first mobile body from the image captured by the imaging means, and the second mobile body coordinate calculation means 13 detects the position of the second mobile body from the reflection data represented by the reflection wave of the second mobile body.

The first reliability calculation means 3 calculates the first reliability of the first mobile body (step S103). Likewise, the second reliability calculation means 12 calculates the second reliability of the second mobile body (step S304). Specifically, the second reliability calculation means 12 calculates the second reliability by specifying the transition of the strength of the reflection wave based on the feature of the reflection data.

The subsequent process by which the integration processing means 9 detects a mobile body is the same as the process from step S105 to step S108 in FIG. 4.

As described above, in this exemplary embodiment, the first mobile body coordinate calculation means 4 detects the position of the first mobile body from the image captured by the imaging means for capturing an image of the predetermined first detection wavelength. The second mobile body coordinate calculation means 13 detects the position of the second mobile body from the reflection data represented by the reflection wave of the second mobile body detected by the radar for receiving a reflection wave corresponding to a transmitted electromagnetic wave of the predetermined third wavelength. The second reliability calculation means 12 calculates the second reliability, by specifying the transition of the strength of the reflection wave based on the feature of the reflection data.

With such a structure, too, in the case of detecting a mobile body using a plurality of sensors, mobile body detection accuracy can be improved and a mobile body detection failure can be prevented.

Exemplary Embodiment 4

Exemplary Embodiment 4 of a mobile body detection device according to the present invention will be described below. Exemplary Embodiments 1 to 3 each describe the case where the mobile body detection device performs the detection process and the reliability calculation process. The mobile body detection device according to the present invention may be implemented by a plurality of devices.

Figure 11:
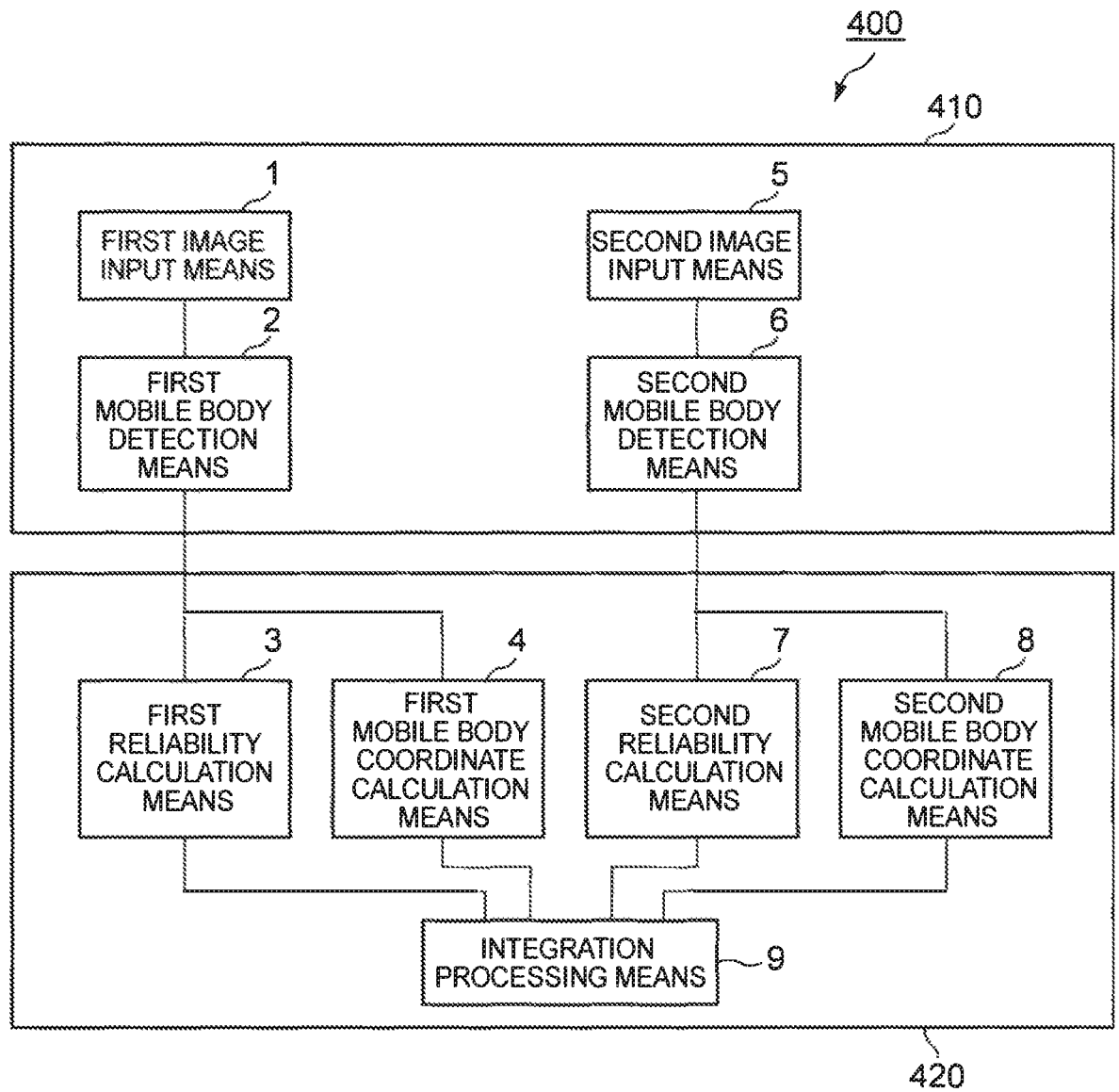
FIG. 11 is a block diagram depicting an example of a structure of Exemplary Embodiment 4 of a mobile body detection device according to the present invention.

FIG. 11 is a block diagram depicting an example of a structure of Exemplary Embodiment 4 of a mobile body detection device according to the present invention. A mobile body detection device 400 in this exemplary embodiment includes a detection device 410 and a detection result processing device 420. Since the mobile body detection device 400 includes a plurality of devices, the mobile body detection device 400 may be also referred to as a movement detection system.

The detection device 410 includes the first image input means 1, the first mobile body detection means 2, the second image input means 5, the second mobile body detection means 6, and a memory (not depicted). The first image input means 1, the first mobile body detection means 2, the second image input means 5, and the second mobile body detection means 6 are, for example, implemented by a CPU operating according to a program stored in the memory.

The detection result processing device 420 includes the first reliability calculation means 3, the first mobile body coordinate calculation means 4, the second reliability calculation means 7, the second mobile body coordinate calculation means 8, the integration processing means 9, and a memory (not depicted). The first reliability calculation means 3, the first mobile body coordinate calculation means 4, the second reliability calculation means 7, the second mobile body coordinate calculation means 8, and the integration processing means 9 in the detection result processing device 420 are, for example, implemented by a CPU operating according to a program stored in the memory.

The first image input means 1, the first mobile body detection means 2, the first reliability calculation means 3, the first mobile body coordinate calculation means 4, the second image input means 5, the second mobile body detection means 6, the second reliability calculation means 7, the second mobile body coordinate calculation means 8, and the integration processing means 9 are the same as those in Exemplary Embodiment 1.

As exceptions, the first mobile body detection means 2 transmits the detection result to the detection result processing device 420 (more specifically, the first reliability calculation means 3 and the first mobile body coordinate calculation means 4), and the second mobile body detection means 6 transmits the detection result to the detection result processing device 420 (more specifically, the second reliability calculation means 7 and the second mobile body coordinate calculation means 8).

A specific example in this exemplary embodiment will be described below. For example, the detection device 410 includes a visible camera and an infrared camera in one housing including a CPU and a memory. The detection device 410 performs the mobile body detection process, and, upon detecting a mobile body, transmits the detection result to the detection result processing device 420 corresponding to a server. Thus, the detection device 410 may function as an intelligent camera.

This exemplary embodiment describes the case where the mobile body detection device 400 is implemented by the components in Exemplary Embodiment 1, but the mobile body detection device 400 may be implemented by the components in Exemplary Embodiment 2 or 3.

In this case, the detection device 410 may have a structure that includes the first image input means 1, the first mobile body detection means 2, the sensor information input means 10, the second mobile body detection means 11, and the memory. The detection result processing device 420 may have a structure that includes the first reliability calculation means 3, the first mobile body coordinate calculation means 4, the second reliability calculation means 12, the second mobile body coordinate calculation means 13, the integration processing means 9, and the memory.

Exemplary Embodiment 5

Exemplary Embodiment 5 of a mobile body detection device according to the present invention will be described below. Exemplary Embodiment 4 describes the case where the plurality of cameras and the plurality of detection means are implemented by one housing (device). Alternatively, one camera may perform only image data acquisition, and transmit acquired data to a device including the other camera to perform mobile body detection.

Figure 12:
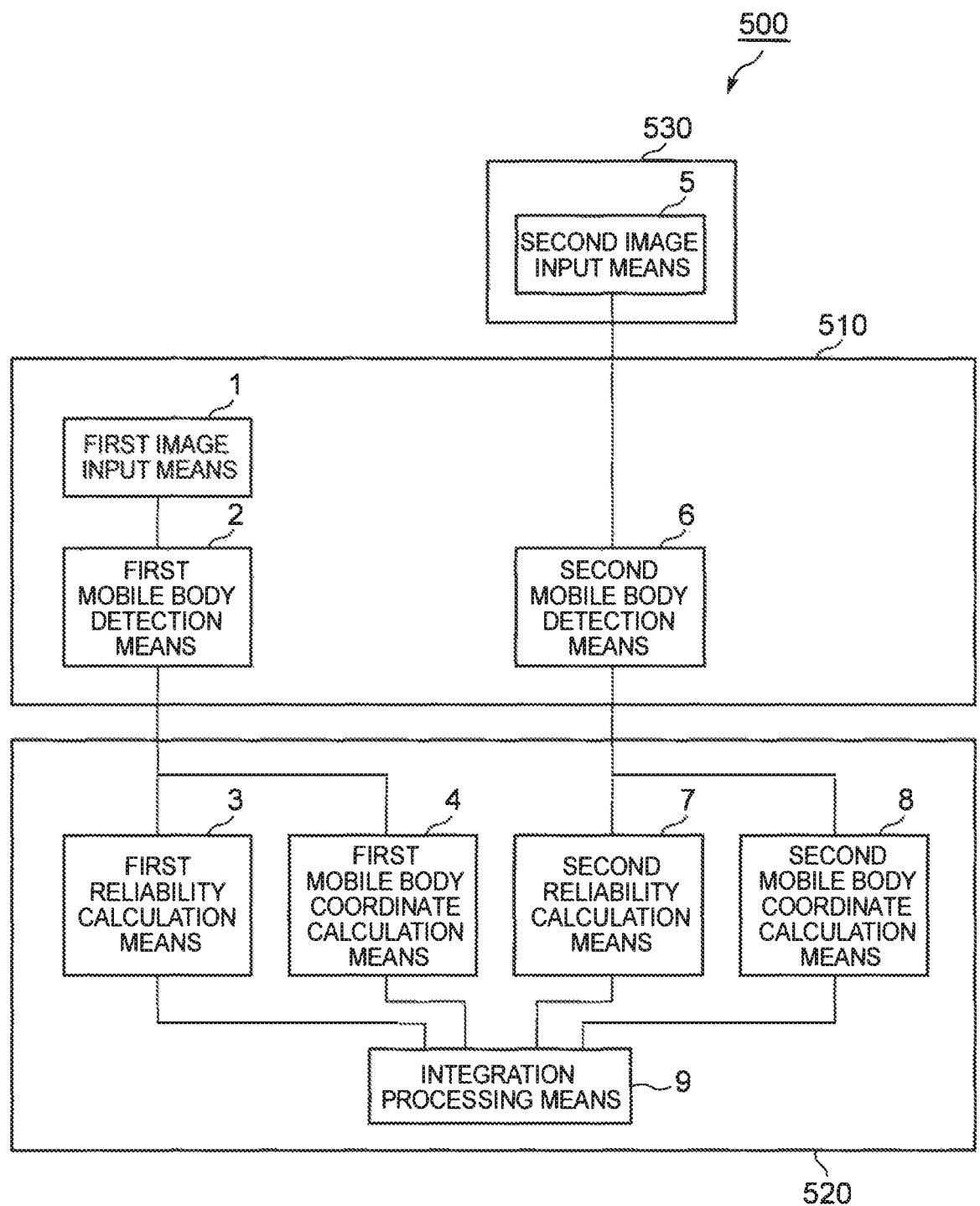
FIG. 12 is a block diagram depicting an example of a structure of Exemplary Embodiment 5 of a mobile body detection device according to the present invention.

FIG. 12 is a block diagram depicting an example of a structure of Exemplary Embodiment 5 of a mobile body detection device according to the present invention. A mobile body detection device 500 in this exemplary embodiment includes a detection device 510, a detection result processing device 520, and an image acquisition device 530. Since the mobile body detection device 500 includes a plurality of devices, the mobile body detection device 500 may be also referred to as a movement detection system.

The detection device 510 includes the first image input means 1, the first mobile body detection means 2, the second mobile body detection means 6, and a memory (not depicted). The detection device 510 differs from the detection device 410 in Exemplary Embodiment 4 in that the second image input means 5 is not included. The other parts are the same as those in Exemplary Embodiment 4. The detection result processing device 520 is the same as the detection result processing device 420 in Exemplary Embodiment 4.

The image acquisition device 530 includes the second image input means 5. The second image input means 5, upon receiving input of a captured image, transmits the image to the detection device 510 (more specifically, the second mobile body detection means 6).

A specific example in this exemplary embodiment will be described below. For example, the detection device 510 includes a visible camera in one housing including a CPU and a memory. The image acquisition device 530 is implemented by a housing including an infrared camera. That is, the visible camera (e.g. IP camera) and the infrared camera are implemented by different housings. The image acquisition device 530 transmits an image captured by the infrared camera to the detection device 510. The detection device 510 performs the mobile body detection process, and, upon detecting a mobile body, transmits the detection result to the detection result processing device 520 corresponding to a server. Thus, the detection device 510 may function as an intelligent camera.

The mobile body detection device 500 may be implemented by the components in Exemplary Embodiment 2 or 3, as in Exemplary Embodiment 4.

Figure 13:
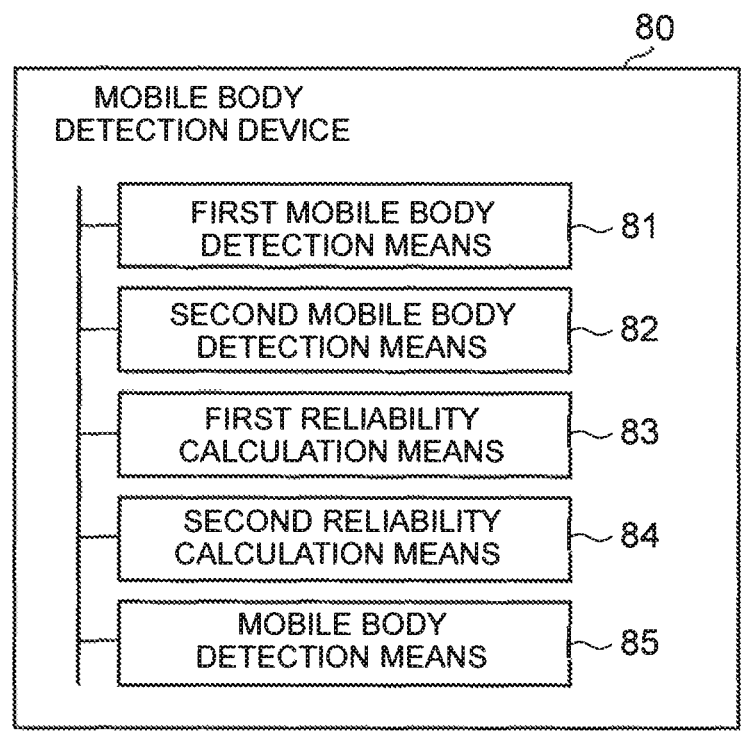
FIG. 13 is a block diagram depicting an overview of a mobile body detection device according to the present invention.

An overview of the present invention will be given below. FIG. 13 is a block diagram depicting an overview of a mobile body detection device according to the present invention. The mobile body detection device according to the present invention includes: a first mobile body detection means 81 (e.g. first mobile body detection means 2 and first mobile body coordinate calculation means 4) which detects a position of a first mobile body from information (e.g. image) acquired using a first sensor (e.g. imaging means); a second mobile body detection means 82 (e.g. second mobile body detection means 6, 11 and second mobile body coordinate calculation means 8, 13) which detects a position of a second mobile body from information (e.g. image, acoustic data, reflection data) acquired using a second sensor (e.g. imaging means, acoustic sensor, radar); a first reliability calculation means 83 (e.g. first reliability calculation means 3) which calculates first reliability of the first mobile body; a second reliability calculation means 84 (e.g. second reliability calculation means 7, 12) which calculates second reliability of the second mobile body; and a mobile body detection means 85 (e.g. integration processing means 9) which determines mobile body detection based on the position of the first mobile body and the position of the second mobile body.

The mobile body detection means 85: determines, in the case where the position of the first mobile body and the position of the second mobile body are approximately the same, that a mobile body is detected at the position; and determines, in the case where the position of the first mobile body and the position of the second mobile body are different and any of the first reliability and the second reliability exceeds a threshold, that a mobile body is detected at a position of a mobile body corresponding to the reliability exceeding the threshold.

With such a structure, in the case of detecting a mobile body using a plurality of sensors, mobile body detection accuracy can be improved and a mobile body detection failure can be prevented.

The first sensor and the second sensor are two types of sensors having different properties.

Specifically, the first sensor may be a first imaging means which captures an image of a predetermined first detection wavelength, and the second sensor may be a second imaging means which captures an image of a predetermined second detection wavelength different from the first detection wavelength. Here, the first mobile body detection means 81 may detect the position of the first mobile body from the image captured by the first imaging means, and the second mobile body detection means 82 may detect the position of the second mobile body from the image captured by the second imaging means.

For example, the first detection wavelength is a visible light wavelength, and the second detection wavelength is a near-infrared ray wavelength or a far-infrared ray wavelength.

Specifically, the first sensor may be an imaging means which captures an image of a predetermined first detection wavelength, and the second sensor may be a microphone array including a plurality of acoustic sensors. Here, the first mobile body detection means 81 may detect the position of the first mobile body from the image captured by the imaging means, the second mobile body detection means 82 may detect, as the position of the second mobile body, a position of a sound source from acoustic data detected by the microphone array, and the second reliability calculation means 84 may calculate the second reliability of the sound source by specifying movement of the sound source based on a feature of the sound source.

Specifically, the first sensor may be an imaging means which captures an image of a predetermined first detection wavelength, and the second sensor may be a radar which receives a reflection wave corresponding to a transmitted electromagnetic wave of a predetermined third wavelength. Here, the first mobile body detection means 81 may detect the position of the first mobile body from the image captured by the imaging means, the second mobile body detection means 82 may detect the position of the second mobile body from reflection data represented by a reflection wave of the second mobile body, and the second reliability calculation means 84 may calculate the second reliability by specifying a transition of a strength of the reflection wave based on a feature of the reflection data.

Although the present invention has been described with reference to the exemplary embodiments and examples, the present invention is not limited to the foregoing exemplary embodiments and examples. Various changes understandable by those skilled in the art can be made to the structures and details of the present invention within the scope of the present invention.

This application claims priority based on Japanese Patent Application No. 2017-52195 filed on Mar. 17, 2017, the disclosure of which is incorporated herein in its entirety.

INDUSTRIAL APPLICABILITY

The present invention is suitable for use in a mobile body detection device for detecting a mobile body using sensors. The present invention is particularly suitable for use in a system for detecting a moving object against a background that changes greatly, such as a drone.

REFERENCE SIGNS LIST 1 first image input means
2 first mobile body detection means
3 first reliability calculation means
4 first mobile body coordinate calculation means
5 second image input means
6 second mobile body detection means
7 second reliability calculation means
8 second mobile body coordinate calculation means
9 integration processing means
10 sensor information input means
11 second mobile body detection means
12 second reliability calculation means
13 second mobile body coordinate calculation means

What is claimed is:

1. A mobile body detection device comprising:
a memory storing instructions; and
one or more processors configured to process the instructions to:
detect a first position of a first mobile body from information acquired using a first sensor;
detect a second position of a second mobile body from information acquired using a second sensor;
calculate first reliability of the first mobile body;
calculate second reliability of the second mobile body;
determine whether the first position and the second position are the same or different; and
determine, in the case where the first position of the first mobile body and the second position of the second mobile body are different and any of the first reliability and the second reliability exceeds a threshold, that a mobile body is detected at a position of a mobile body corresponding to the reliability exceeding the threshold.

2. The mobile body detection device according to claim 1, wherein the first sensor and the second sensor are two types of sensors having different properties.

3. The mobile body detection device according to claim 1, wherein the first sensor is a first imaging unit which captures an image of a predetermined first detection wavelength,
the second sensor is a second imaging unit which captures an image of a predetermined second detection wavelength different from the first detection wavelength,
detect the first position of the first mobile body from the image captured by the first imaging unit, and
detect the second position of the second mobile body from the image captured by the second imaging unit.

4. The mobile body detection device according to claim 3, wherein the first detection wavelength is a visible light wavelength, and the second detection wavelength is a near-infrared ray wavelength or a far-infrared ray wavelength.

5. The mobile body detection device according to claim 1, wherein the first sensor is an imaging unit which captures an image of a predetermined first detection wavelength,
the second sensor is a microphone array including a plurality of acoustic sensors,
the first position of the first mobile body is detected from the image captured by the imaging unit,
the second position of the second mobile body is detected as a position of a sound source from acoustic data detected by the microphone array, and
the second reliability calculation unit calculates the second reliability of the sound source by specifying movement of the sound source based on a feature of the sound source.

6. The mobile body detection device according to claim 1, wherein the first sensor is an imaging unit which captures an image of a predetermined first detection wavelength,
the second sensor is a radar which receives a reflection wave corresponding to a transmitted electromagnetic wave of a predetermined third wavelength,
the first position of the first mobile body is detected from the image captured by the imaging unit,
the second position of the second mobile body is detected from reflection data represented by a reflection wave of the second mobile body, and
the second reliability is calculated by specifying a transition of a strength of the reflection wave based on a feature of the reflection data.

7. A mobile body detection method comprising:
detecting a first position of a first mobile body from information acquired using a first sensor;
detecting a second position of a second mobile body from information acquired using a second sensor;
calculating first reliability of the first mobile body and second reliability of the second mobile body;
determining, whether the first and the second position are the same or different; and
determining, in the case where the first position of the first mobile body and the second position of the second mobile body are different and any of the first reliability and the second reliability exceeds a threshold, that a mobile body is detected at a position of a mobile body corresponding to the reliability exceeding the threshold.

8. The mobile body detection method according to claim 7, wherein the first sensor and the second sensor are two types of sensors having different properties.

9. A non-transitory computer readable information recording medium storing a mobile body detection program, when executed by a processor, that performs a method for:
- detecting a first position of a first mobile body from information acquired using a first sensor;
- detecting a second position of a second mobile body from information acquired using a second sensor;
- calculating first reliability of the first mobile body;
- calculating second reliability of the second mobile body;
- determining whether the first position and the second position are the same or different; and
- determining, in the case where the first position of the first mobile body and the second position of the second mobile body are different and any of the first reliability and the second reliability exceeds a threshold, that a mobile body is detected at a position of a mobile body corresponding to the reliability exceeding the threshold.

10. The non-transitory computer readable information recording medium according to claim 9, wherein the first sensor and the second sensor are two types of sensors having different properties.

* * * * *